United States Patent
Brown, III

(10) Patent No.: US 6,566,416 B2
(45) Date of Patent: *May 20, 2003

(54) FRAGRANT THERMOPLASTIC SNOW AND METHOD OF MANUFACTURE

(76) Inventor: Alanson C. Brown, III, 4195 Hwy. 93 South, Kalispell, MT (US) 59901

( * ) Notice: Subject to any disclaimer, the term of this patent is extended or adjusted under 35 U.S.C. 154(b) by 0 days.

This patent is subject to a terminal disclaimer.

(21) Appl. No.: 09/860,223

(22) Filed: May 18, 2001

(65) Prior Publication Data

US 2001/0033933 A1 Oct. 25, 2001

Related U.S. Application Data

(62) Division of application No. 09/370,374, filed on Aug. 9, 1999, now Pat. No. 6,258,871.

(51) Int. Cl.[7] .................................................. C08J 3/00
(52) U.S. Cl. ...................................................... 523/102
(58) Field of Search .......................... 523/102; 428/402, 428/407; 252/1

(56) References Cited

U.S. PATENT DOCUMENTS

| 3,291,486 | A | * | 12/1966 | Applegath | 272/56.5 |
|---|---|---|---|---|---|
| 3,736,847 | A | * | 6/1973 | Hickey | 272/56.5 |
| 4,126,571 | A | * | 11/1978 | Light | 252/108 |
| 5,129,587 | A | * | 7/1992 | Neefe | 241/27 |
| 5,261,245 | A | * | 11/1993 | Tanaka et al. | 62/59 |
| 5,660,935 | A | * | 8/1997 | Kombayashi et al. | 428/405 |
| 6,258,871 | B1 | * | 7/2001 | Brown, III | 523/102 |

FOREIGN PATENT DOCUMENTS

WO          WO 95/15146 A1  *  6/1995

* cited by examiner

Primary Examiner—Edward J. Cain
Assistant Examiner—Katarzyna Wyrozebski Lee
(74) Attorney, Agent, or Firm—Burkhart & Burkhart; Anne K. Burkhart; Patrick N. Burkhart

(57) ABSTRACT

A fragrant thermoplastic snow product for creating winter scenes and pleasing aromatic affects is set forth. The fragrant thermoplastic snow product includes a thermoplastic snow, and a fragrance applied to the thermoplastic snow. A method of manufacturing fragrant thermoplastic snow is also set forth. The method comprises the following steps. First, a batch of thermoplastic snow is provided. Next, a fragrance is mixed with the batch of thermoplastic snow. Finally, the batch of thermoplastic snow is dried.

12 Claims, 2 Drawing Sheets

FRAGRANT THERMOPLASTIC SNOW AND METHOD OF MANUFACTURE

CROSS-REFERENCE TO RELATED APPLICATIONS

This application is a division of application Ser. No 09/370,374, filed Aug. 9, 1999, now U.S. Pat. No. 6,258,871.

STATEMENT AS TO RIGHTS TO INVENTIONS MADE UNDER FEDERALLY-SPONSORED RESEARCH AND DEVELOPMENT

None

FIELD OF THE INVENTION

This invention relates generally to thermoplastic snow. In particular, this invention relates to both a fragrant thermoplastic snow and to a method of manufacture for producing fragrant thermoplastic snow.

BACKGROUND

Few things can surpass the power of aromas like evergreen, cinnamon, or vanilla in evoking nostalgia for old-fashioned holidays. Even though modern "advancements" such as dual-income couples, pagers, and allergy awareness have brought on artificial trees and "store-bought" sugarplums, the scent of a fresh-cut fir and holiday baking hold a dear place in the hearts of many. For those people, the winter holiday is a time for decorating trees and creating or displaying winter scenes in their homes. However, even the most lavishly decorated artificial trees lack the wonderful aroma of a fresh-cut evergreen. The reasons many use artificial trees include, for example, the fact that many people suffer from allergies to the sap of evergreen trees, or may prefer to avoid the mess that can be generated by a fresh tree or the inconvenience of selecting and purchasing a tree every year. Similarly, the many demands on families have usurped the amount of time necessary to prepare and serve the abundant holiday feasts of bygone days. The fact that enthusiasm for holiday time is undiminished is evidenced by the great number of people who do all they can to create a winter holiday display. Unfortunately, the magic of the holiday scents is frequently absent from their homes.

As a result, many ways have been developed to introduce seasonal, holiday, or evergreen scents into winter displays while avoiding the problems associated with using fresh trees. It has been known to provide these scents in a variety of carriers, such as holiday potpourri, scented candles, incense, and the like.

For example, U.S. Pat. No. 4,799,520 discusses a cover for Christmas trees which includes a tree-encapsulating bag or sheath provided with a center opening for receiving the trunk of the tree, a center string sleeve encircling the center opening and slidably containing a center perimeter string for tightening the center segment of the sheath against the trunk and an outside perimeter sleeve for containing an outside perimeter string. The cover can be scented and decorated and may be round or shaped in the configuration of a regular or irregular polygon, such as a square or rectangle, as desired.

U.S. Pat. No. 3,544,783. This invention relates generally to an artificial tree, and more particularly to a vertically sectionalized, compactly storable, quickly assembled and disassembled artificial Christmas tree provided with substantially completely concealed means for decoratively electrically illuminating the same. The base element of tree base section may also be provided with an opening formed therethrough at a desired point, and a perforated container containing a suitable aromatic substance emitting a "woodsy" odor may be placed on base element adjacent thereto; the aroma passing through opening to permeate the air around artificial Christmas tree and enhance the impression of naturalness thereof.

The manufacture of artificial snow for decorative purposes is also known in the art. For example, U.S. Pat. No. 2,835,997 relates to a method and article of manufacture for forming a dry, flaky slightly adherent substance which may be colored for decorative purposes. U.S. Pat. No. 5,129,587 discusses a method of making STYROFOAM fluff from STYROFOAM. The fluff particles are torn away from the STYROFOAM by a rapidly rotating router blade. The pulling away of small pieces from the STYROFOAM provides an increased volume to the fluff.

It is also known to apply a scent to artificially-created frozen snow. U.S. Pat. No. 5,753,370 discusses an artificial snowseed in the form of granules of a super water-absorbing polymer already coated with a fluorine-containing material and/or a silicone oil. The snowseed of the invention may be colored with known pigments or dyes. The artificial snow made from the colored artificial snowseed looks beautiful, and a commercial value may be added to it. For example, discrimination of ski slopes by coloring for beginners or experts may add a more fun. Further, other additives, e.g. perfume, fragrance, or aroma may be added.

However, none of these patents provide a convenient scenting mechanism that is aromatically pleasant, cost effective, and a decorative accent in any holiday decor. It can be seen from the foregoing that the need exists for a fragrant decorative accent that adds beauty and fragrance to any holiday display.

SUMMARY

A frequently used decorative accent that adds beauty to any holiday display is thermoplastic snow. Advantageously, the present invention provides a fragrant thermoplastic snow product for creating winter scenes and a pleasing aromatic affect. The fragrant thermoplastic snow product includes a thermoplastic snow, and a fragrance applied to the thermoplastic snow. The fragrance can include a liquid carrier, and an essential oil in solution with the carrier. The liquid carrier can include water. The proportion of liquid carrier to essential oil in the fragrance can be approximately 5% to 35% carrier and 65% to 95% essential oil. The essential oil can include one or more oils selected from a group consisting of pine, fir, cedar, cinnamon, and vanilla.

A method of manufacturing fragrant thermoplastic snow is also set forth. The method comprises the following steps. First, a batch of thermoplastic snow is provided. Next, a fragrance is mixed with the batch of thermoplastic snow. Finally, the batch of thermoplastic snow is dried. The step of providing a batch of thermoplastic snow can include placing a batch of thermoplastic snow into a rotatable mesh drum tumbler. The step of mixing a fragrance with the batch of thermoplastic snow can include applying the fragrance to the batch of thermoplastic snow. The fragrance can include a liquid carrier and an essential oil in solution with the carrier, and the step of mixing the fragrance with the batch of thermoplastic snow can include applying the fragrance to the batch of thermoplastic snow by spraying the fragrance onto the batch of thermoplastic snow. The step of mixing can include spraying the fragrance onto the batch of thermoplastic snow with a pump spray bottle. The step of mixing can further include tumbling the batch of thermoplastic snow in a rotatable mesh drum tumbler. The step of drying can include continuing tumbling the batch of thermoplastic snow in the rotatable mesh tumbler until the batch is dry.

A method of manufacturing fragrant thermoplastic snow can also include the following steps. First, a batch of thermoplastic snow is placed in a rotatable mesh drum tumbler. Next, a fragrance is misted onto the batch of thermoplastic snow. The tumbler is then rotated to mix the fragrance with the batch of thermoplastic snow, thereby forming a batch of fragrant thermoplastic snow. Finally, the batch of fragrant thermoplastic snow is dried. The step of misting the fragrance can include forming the fragrance from a liquid carrier and an essential oil in solution with the carrier. The liquid carrier can include water. The essential oil can include one or more oils selected from a group consisting of pine, fir, cedar, cinnamon, and vanilla. The step of misting further includes placing the fragrance so formed into a pump spray bottle, and activating the handle of the pump spray bottle to form a mist. The batch of thermoplastic snow can include expanded polypropylene.

The details provided in the accompanying drawings and detailed description provide specific examples of a fragrant thermoplastic snow and of a method of manufacturing fragrant thermoplastic snow as set forth in the claims. Thus, although specific variations of the invention are shown and discussed, the invention as set forth in the claims includes all possible variations that, although not discussed or suggested, would be obvious to a person of ordinary skill in the art.

DETAILED DESCRIPTION OF A PREFERRED EMBODIMENT

Figure 1:
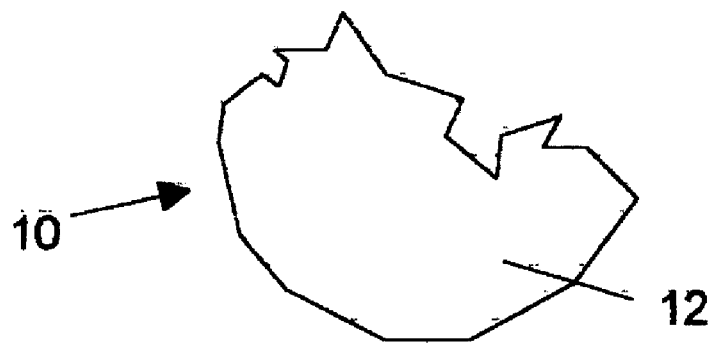
FIG. 1 is schematic illustration of a fragrant thermoplastic snow product.

The fragrant thermoplastic snow and method of the present invention improve the aroma and beauty of a typical holiday display. To this end, suitable thermoplastic snow elements, illustrated generally at 10 in FIG. 1 are provided. An example of suitable thermoplastic snow is expanded polypropylene, such as NORTH WOODS SNOW manufactured by Gladon Company, Inc. A suitable fragrance for imparting a desired scent on the thermoplastic snow can be formed by providing a liquid carrier, and an essential oil in solution with the carrier.

The liquid carrier can be water, or a suitable aqueous solution. For example, where the desired fragrance requires a distillation process, such as extracting the scent of wild roses, a mixture of water and vodka can be the liquid carrier. Where the scent is primarily derived using at least one essential oil, the proportion of liquid carrier to essential oil is preferably approximately 5% to 35% carrier and 65% to 95% essential oil. The essential oil can include one or more oils selected from a group consisting of pine, fir, cedar, cinnamon, and vanilla, or of any scent desired. The amount of essential oil proportionally used can vary depending on the potency of the oil and the desired strength of the fragrance.

Once a fragrance for the thermoplastic snow 10 has been achieved, the fragrance is applied to the thermoplastic snow 10 and allowed to dry, forming dried on fragrance areas 12 that are invisible to the naked eye (shown here in enlarged form).

A number of combinations of spray applicators for applying the fragrance and appropriate environments for drying the thermoplastic snow 10 are available. For example, the spray applicators could be spray valves suspended above a conveyor of thermoplastic snow 10, and drying the fragrance could be achieved by tumbling, air drying, or an environment of elevated temperature, where the integrity of the thermoplastic snow 10 is not disturbed by the temperature elevation.

Figure 2:
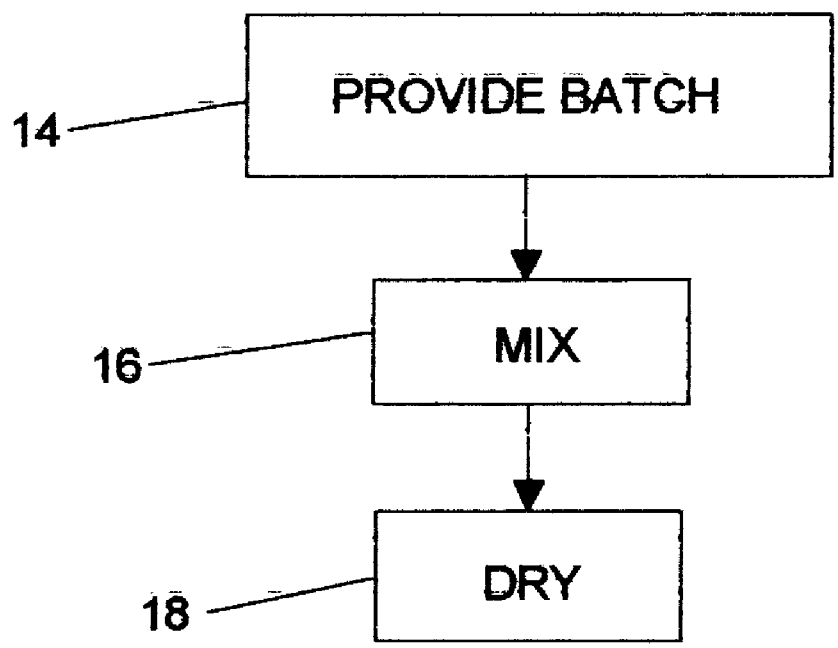
FIG. 2 is a flow chart for a method of manufacturing fragrant thermoplastic snow.

A flow chart of a method of manufacturing fragrant thermoplastic snow is illustrated in FIG. 2. First, a batch of thermoplastic snow is provided at 14. The batch is then mixed with a fragrance at 16, i.e., the fragrance is spread throughout the batch. For example, where the batch of thermoplastic snow is provided on a conveyor, a selected fragrance is spread by moving the conveyor past sprayers containing the fragrance. The fragrance can also be spread through the batch of thermoplastic snow as described below with reference to FIG. 3. Finally, the batch of thermoplastic snow is dried at 18, forming dried fragrance areas.

Figure 3:
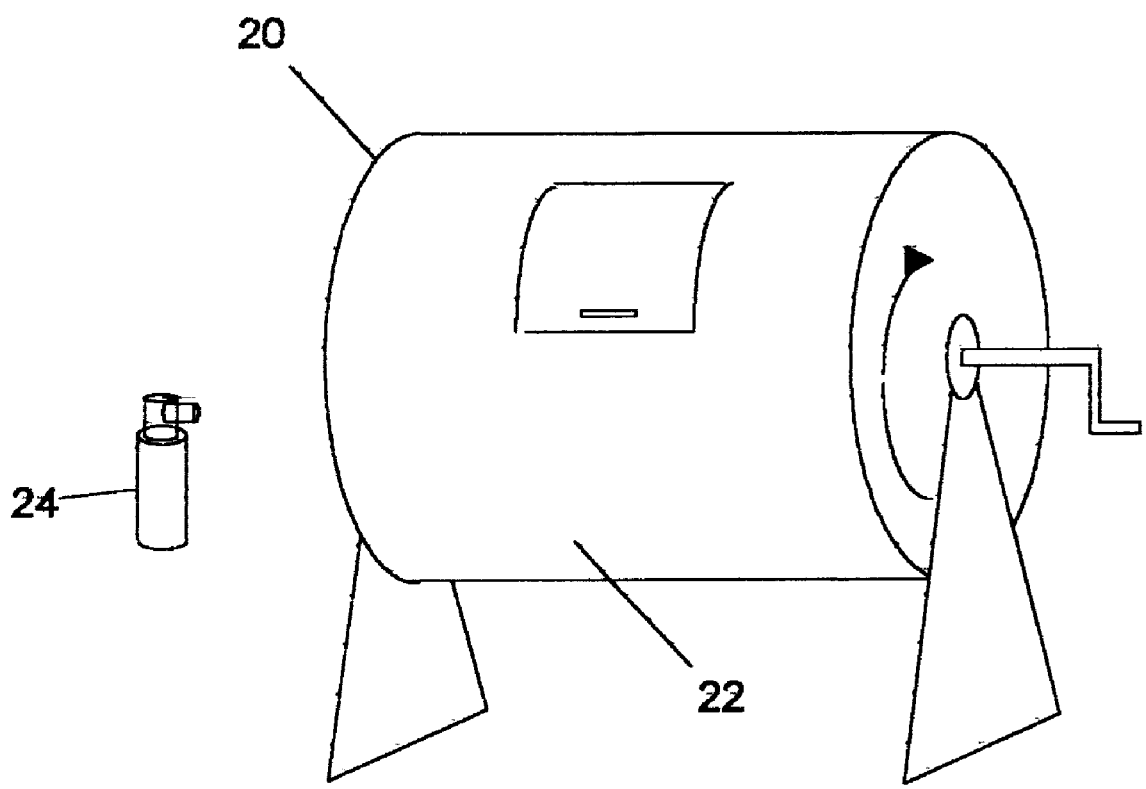
FIG. 3 is a schematic illustration of one embodiment of an apparatus for manufacturing fragrant thermoplastic snow.

FIG. 3 provides a schematic illustration of one embodiment of an apparatus for manufacturing thermoplastic snow. The apparatus includes a rotatable mesh drum tumbler 20, adapted to receive a batch of thermoplastic snow 22. A selected fragrance can be applied to the snow 22 using a pump spray bottle 24. The fragrance is applied by activating the spray pump 24, causing a mist of fragrance to come into contact with the snow 22. The fragrance can then be spread throughout the snow 22 by rotating an arm 26 of the tumbler 20. The tumbler 20 can then be continually rotated until the snow 22 is dried. Any suitable rotatable mesh tumbler can be used.

Although the above examples are discussed with specific reference to holiday decor uses, the fragrant thermoplastic snow of the present invention is suitable for use as a scented stuffing or stuffing additive for decorative pillows, stuffed animals, and any other item for which a scented stuffing, stuffing additive, or filler material may be desired. The fragrant thermoplastic snow of the present invention is also suitable for use as a packaging material, or as a packaging element in association with other packaging materials such as bubble wrap.

While details of the invention are discussed herein with reference to some specific examples to which the principles of the present invention can be applied, the applicability of the invention to other uses and equivalent components, i.e., decorative or functional plastics, thereof will become readily apparent to those of skill in the art.

Accordingly, it is intended that all such alternatives, modifications, permutations, and variations to the exemplary embodiments can be made without departing from the scope and spirit of the present invention as defined by the appended claims.

I claim:

1. A fragrant thermoplastic snow product for creating winter scenes and pleasing aromatic affects comprising:
 a plurality of thermoplastic snowflake-shaped elements; and
 a fragrance applied to the thermoplastic snowflake-shaped elements.

2. A product as set forth in claim 1, wherein the fragrance comprises the following:

a liquid carrier; and an essential oil in solution with the carrier.

3. A product as set forth in claim 2, wherein the liquid carrier comprises water.

4. A product as set forth in claim 2, wherein the proportion of liquid carrier to essential oil is approximately between 5% and 35% carrier and between 65% and 95% essential oil.

5. A product as set forth in claim 2, wherein the essential oil comprises one or more oils selected from a group consisting of pine, fir, cedar, cinnamon, and vanilla.

6. A method of manufacturing fragrant thermoplastic snow comprising the following steps:

provideing a batch of thermoplastic snowflake-shaped elements;

mixing a fragrance with the batch of thermoplastic snowflake-shaped elements; and drying the batch of thermoplastic snowflake-shaped elements.

7. A method as set forth in claim 6, wherein the step of providing a batch of thermoplastic snowflake-shaped elements comprises placing a batch of thermoplastic snowflake-shaped elements into a rotatable mesh drum tumbler.

8. A method as set forth in claim 6, wherein the step of mixing a fragrance with the batch of thermoplastic snowflake-shaped elements comprises applying the fragrance to the batch of thermoplastic snowflake-shaped elements.

9. A method as set forth in claim 8, wherein the fragrance comprises a liquid carrier and an essential oil in solution with the carrier, and wherein the step of mixing the fragrance with the batch of snowflake-shaped elements comprises applying the fragrance to the batch of thermoplastic snowflake-shaped elements by spraying the fragrance onto the batch of thermoplastic snowflake-shaped elements.

10. A method as set forth in claim 9, wherein the step of mixing comprises spraying the fragrance onto the batch of thermoplastic snowflake-shaped elements with a pump spray bottle.

11. A method as set forth in claim 8, wherein the step of mixing further comprises tumbling the batch of thermoplastic snowflake-shaped elements in a rotatable mesh drum tumbler.

12. A method as set forth in claim 11, wherein the step of drying comprises continuing tumbling the batch of thermoplastic snowflake-shaped elements in the rotatable mesh tumbler until the batch is dry.

* * * * *